United States Patent
Spruit et al.

[11] Patent Number: 6,021,109
[45] Date of Patent: Feb. 1, 2000

[54] OPTICAL RECORDING MEDIUM

[75] Inventors: Johannes H. M. Spruit, Eindhoven, Netherlands; Johan P. W. B. Duchateau, Wellen, Belgium

[73] Assignee: U.S. Philips Corporation, New York, N.Y.

[21] Appl. No.: 09/085,684

[22] Filed: May 27, 1998

Related U.S. Application Data

[63] Continuation-in-part of application No. 08/972,510, Nov. 18, 1997.

[51] Int. Cl.[7] ............................................. G11B 7/00
[52] U.S. Cl. ................................. 369/275.1; 369/275.4; 369/100
[58] Field of Search ....................... 369/275.1, 275.4, 369/277, 279, 283, 100, 109, 118, 44.26, 13, 47, 48, 59, 58, 54

[56] References Cited

U.S. PATENT DOCUMENTS

| | | | |
|---|---|---|---|
| 4,057,833 | 11/1977 | Braat | 358/128 |
| 5,493,561 | 2/1996 | Nishiuchi et al. | 369/275.1 |
| 5,871,881 | 2/1999 | Nishida et al. | 369/284 X |
| 5,878,022 | 3/1999 | Okada et al. | 369/275.1 X |

*Primary Examiner*—Muhammad Edun
*Attorney, Agent, or Firm*—Michael E. Belk

[57] ABSTRACT

An optical recording medium having a recording layer with grooves that define recording tracks. The structure of unwritten tracks enable a scanning device to derive a radial tracking error signal using the push-pull method. The structure of the written tracks enable the scanning device to derive a radial tracking error signal using the high-frequency phase-detection method. The width of the groove is in the range from 0.3 to 0.6 time the wavelength over the numerical aperture for scanning the recording medium. The depth of the groove is in the range from 1/24 to 1/7 times the wavelength for scanning the recording medium. The phase difference between a radiation beam reflected from a track at a mark and a radiation beam reflected from that track in a region between written marks is in the range from 0.4 to 2.0 radians.

24 Claims, 2 Drawing Sheets

OPTICAL RECORDING MEDIUM

CROSS REFERENCE TO RELATED APPLICATIONS

This is a continuation-in-part of application Ser. No. 08/972,510, filed Nov. 18, 1997 which is herein incorporated in whole by reference.

FIELD OF THE INVENTION

The invention relates to the field of multi-layer optical recording media.

BACKGROUND OF THE INVENTION

An optical recording medium for writing and reading information uses a radiation beam having a predetermined wavelength and a predetermined numerical aperture. The medium includes a recording layer and the recording layer is changed from a first to a second state upon irradiation by a radiation beam. The recorded information is represented by written marks in the second state within a region in the first state. The marks are arranged in one or more tracks including a guide groove having a width and a depth. A first optical phase difference exists between the reflection from a region on the tracks in the first state and from a region on the tracks in the second state. The first optical phase difference enhances an optical phase difference between a region in between the tracks in the first state and the region on the tracks in the first state.

Information may be stored in such a recording medium by a scanning device having an optical head. The head focuses a radiation beam onto the information layer in the medium and follows an unwritten track using tracking information derived from the groove in the track. When the medium is disc-shaped, the grooves are circular or spiral and the tracking information includes a radial tracking error signal. When a relatively high power radiation beam is modulated by a signal representing the information to be written, the information is written in the tracks as optically detectable marks. During reading, the radiation beam has a relatively low power, which, on reflection from the information layer, is modulated by the marks. The tracking information may be derived during reading from the grooves or from the written information.

An optical recording medium in Japanese patent application JP-A 5174380 includes a stack of optical thin layers in which the recording layer is embedded. The thickness of a transparent layer of the stack adjacent the recording layer is tuned such that the first optical phase difference between unwritten and written regions of a track increases a second optical phase difference between a region in between the tracks in the first state and a region on the tracks also in the first state. This relation between the phase differences increases the information signal derived from the scanned marks.

Generally, for single layer media, information for controlling tracking is obtained by the push-pull method or the phase detection method. The push-pull method for deriving tracking information is known from U.S. Pat. No. 4,057,833. The phase-detection method for deriving tracking information is known from U.S. Pat. No. 4,785,441.

All the above citations are hereby incorporated in whole by reference.

SUMMARY OF THE INVENTION

A disadvantage of the known recording medium is that the tracks cannot properly be followed by a scanning device using either the so-called push-pull method or phase detection method for deriving a tracking signal from marks written in the information layer.

It is an object of the invention to provide an optical recording medium from which tracking information can be derived from the written marks according to the push-pull method and also from the written information.

In the invention the width of the guide groove is in the range from 0.3 to 0.6 times the wavelength over the numerical aperture, the optical depth of the guide groove is in the range from $1/24$ to $1/7$ times the wavelength over a refractive index met by the radiation beam, and the first optical phase difference is in the range from 0.4 to 2.0 radians. The combination of the particular values of the groove width and the phase difference provides both a high-quality push-pull signal or phase detection signal and a high-quality information signal from the written marks. The phase difference enhances both the information signal and the push-pull signal.

The minimum groove depth provides that a scanning device will be able to derive a high-quality push-pull signal from the grooves. Grooves deeper than the maximum groove depth reduce the quality of the phase detection signal. Moreover, the phase detection signal from deeper grooves becomes strongly dependent on the defocus of the radiation beam.

The depth of the groove is given as the mechanical depth. The refractive index met by the radiation beam is the index of the material in between the grooves. The material is that of a transparent substrate or of a protective layer if the radiation beam is incident on the recording layer through the substrate or through the protective layer, respectively.

The width of the grooves is preferably larger than the width of the marks designed to be written in the recording layer.

The tracking signal formed by the phase-detection method is generally affected by the axial position of the focal point of the radiation beam with respect to the position of the recording layer. When the radiation beam is not in focus on the recording layer, the amplitude of the tracking signal may decrease significantly and even change sign. This effect is already mitigated when the first phase difference lies within the range from 0.4 to 2.0 radians. A further reduction of the effect will be achieved when the width and depth of the guide groove comply with:

$$8.33\ NA\ D/n + 121\ NA/\lambda - 400\ NA\ \Phi/\lambda < W,$$

where NA is the numerical aperture, $\lambda$ the wavelength in nanometers (nm), $\Phi$ the first optical phase difference in radians, n the refractive index, D the depth in units of $\lambda/n$ and W the width in units of $\lambda/NA$.

The first optical phase difference is preferably in the range from 0.4 to 1.1 radians. A medium having a phase difference smaller than this value, will show an asymmetric tracking signal as derived by the phase-detection method. The asymmetry shows up as different amplitudes of the tracking signal when the radiation beam is focussed below and above the recording layer. A possible measure of the asymmetry is $(x-y)/(2z)$, where x is the maximum value of the phase-detection tracking error signal when the radiation beam is focussed 1 $\mu$m above the information plane, y the maximum value of the phase-detection tracking error signal when the radiation beam is focussed 1 $\mu$m below the information plane, and z the maximum value of the phase-detection tracking error signal when the radiation beam is focussed on the information plane.

A further improvement of the phase-detection tracking signal can be achieved when the ratio of intensity of reflection of a region on the tracks in the second state and of a region on the tracks in the first state, is larger than 0.15. Such a medium is called a dark-writing medium. A so-called white-writing medium preferably has a ratio of the intensity of reflection of a region on the tracks in the first state and of a region on the tracks in the second state, larger than 0.15. The symmetry of the tracking signal as derived by the phase-detection method is improved when the ratio lies within the range from 0.3 to 0.5 for both dark-writing and white-writing media.

The intensity of reflection of a region on the tracks in the first state, is preferably larger than 0.15 for a dark-writing medium, in order to be able to derive a good information signal from the radiation reflected from the information layer. For a white-writing medium, the intensity of reflection of a region on the tracks in the second state is preferably larger than 0.15.

The groove in the information layer may be used for storing information such as addresses, used in accessing the information. Such information may be stored as a wobble in the depth or position of the groove. The optical depth of the groove is then preferably in the range from $\frac{1}{12}$ to $\frac{1}{7}$ times the wavelength of the radiation beam over the refractive index.

The optical phase difference of the medium may be provided by embedding the recording layer in a stack of optical thin layers and tuning the thicknesses of the layers. The design of the stack is facilitated when the material of the recording layer in the first state, has an imaginary part of the refractive index larger than 3.4.

The material of the recording layer is preferably of a phase-change type. The writing speed can be relatively high when amorphous marks are written in a crystalline layer. The first state is then a crystalline state and the second state an amorphous state.

These and other aspects of the invention will be apparent from and be elucidated with reference to the embodiments described hereinafter.

DETAILED DESCRIPTION OF PREFERRED EMBODIMENTS

Figure 1:
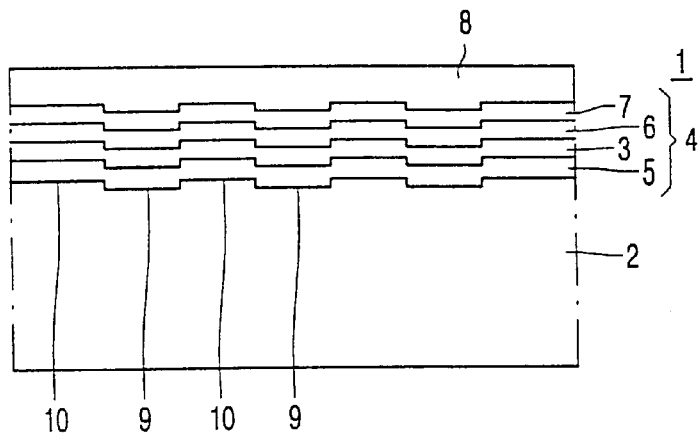
FIG. 1 shows a cross-section of a recording medium according to the invention.

FIG. 1 shows an information recording medium 1 according to the invention designed for writing and reading information using a focussed radiation beam having a design wavelength and numerical aperture. Medium 1 includes a transparent substrate 2 and a recording layer 3. The recording layer may be scanned by a radiation beam incident on the recording layer through substrate 2. Recording layer 3 is embedded in a stack 4 of optical thin layers arranged on substrate 2. The stack includes, starting from the substrate side, a transparent interference layer 5, a recording layer 3, a further interference layer 6, and a reflective layer 7. Stack 4 is shielded from environmental influences by a protective layer 8.

Substrate 2 includes a groove pattern on the side on which stack 4 is arranged. For a disc-shaped medium the groove pattern has circular or spiral grooves. The part of the groove pattern in the Figure, forming a depression in the substrate when viewed from the side of the stack, is called a groove 9. The part of the pattern in the Figure, forming a raised part from the same point of view, is called a land 10. The width of the groove is determined at the top of the groove, i.e. at the land level. The thickness of the layers in stack 4 is so small that the pattern on the substrate 2 is also present in recording layer 3. The following examples are designed for writing in the groove 9 of the recording medium. When, on the other hand, the recording medium is designed for recording on the part 10, the optimum parameter values for the depth and width of the grooves according to the invention apply likewise, but the part of the pattern 9 in the Figure, should be labeled as land, and the part 10, as groove.

EXAMPLE I

The substrate of the recording medium is made of polycarbonate (PC) having a refractive index of 1.58 at the design wavelength of 670 nm and a numerical aperture of 0.60. Interference layer 5 is a 90 nm thick layer of 80% ZnS and 20% $SiO_2$ having a refractive index of 2.13. Recording layer 3 is a 30 nm thick layer of a $GeSb_2Te_4$ phase-change material having a refractive index of 4.26-i 1.69 when in the amorphous state and 4.44-i 3.08 when in the crystalline state. Interference layer 6 is a 30 nm thick layer of the same material as interference layer 5. Reflective layer 7 is a 100 nm thick layer of an aluminum alloy having a refractive index of 1.98-i 7.81. The mechanical depth d of grooves 9 is 40 nm, the width w of the grooves is 500 nm and the pitch of the grooves (which is also the track pitch) is 900 nm.

Figure 2:
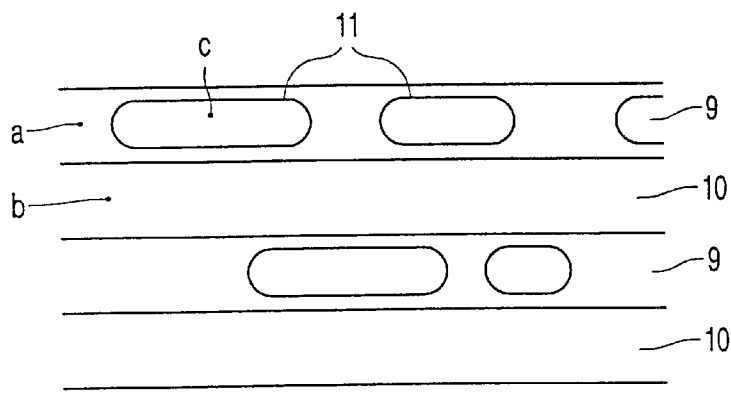
FIG. 2 shows a plan view of the recording layer of the medium.

FIG. 2 shows part of recording layer 3 having grooves 9 and lands 10. The information is written in the grooves. Recording layer 3 is initially in the crystalline state. During writing, amorphous regions 11, called marks, are made in the recording layer. The length and position of the marks represent the information recorded in the medium. The intensity of reflection of stack 4 in a region of the recording layer in the amorphous state is equal to 0.07. The intensity of reflection of stack 4 in a region in the crystalline state is equal to 0.18. The ratio of the amorphous reflection over the crystalline reflection is thus 0.39. Both intensities of reflection have been measured using a focussed radiation beam in regions without grooves.

Radiation reflected from a region on the tracks and in the crystalline state, indicated by 'a' in FIG. 2, is advanced in phase by 1.2 radians compared to radiation reflected from a region 'b' in between the tracks and also in the crystalline state. Radiation reflected from a region on the tracks and in the amorphous state, indicated by 'c' in FIG. 2, is advanced in phase by 0.6 radians compared to radiation reflected from a region 'a' on the tracks and in the crystalline state. Hence, the phase difference between the land and groove is enhanced by the phase difference between marked regions and unmarked regions in between marks. Put differently, the effective depth of the groove is enhanced at the location of the marks.

The push-pull tracking error signal has a measured maximum value of 90% of the value obtained for a medium having a groove depth optimized for a maximum push-pull signal. The phase-detection tracking error signal has a maximum value of 0.24, measured by a scanning device described below. The value of the tracking error signal is a time difference normalized on the channel clock period used for writing the information on the recording medium.

EXAMPLE II

The substrate of the recording medium is again made of polycarbonate (PC) having a refractive index of 1.58 at the design wavelength of 670 nm. The stack has the same order of layers as shown in FIG. 1. Interference layer 5 is a 95 nm thick layer of 80% ZnS and 20% $SiO_2$ having a refractive index of 2.13. Recording layer 3 is a 25 nm thick layer of a $GeSb_2Te_4$ phase-change material having a refractive index of 4.26-i 1.69 when in the amorphous state and 4.44-i 3.08 when in the crystalline state. Interference layer 6 is a 35 nm thick layer of the same material as interference layer 5. Reflective layer 7 is a 100 nm thick layer of an aluminum alloy having a refractive index of 1.98-i 7.81. The mechanical depth of grooves 9 is 55 nm, the width of the grooves is 400 nm and the pitch of the grooves is 900 nm.

The information is written in the grooves as amorphous marks in a crystalline surroundings. The intensity of reflection of stack 4 in a region of the recording layer in the amorphous state, is equal to 0.05. The intensity of reflection of stack 4 in a region in the crystalline state, is equal to 0.16. The ratio of the amorphous reflection over the crystalline reflection is thus 0.31. Both intensities of reflection were measured in regions that are without grooves.

Radiation reflected from a region on the tracks and in the crystalline state, 'a' in FIG. 2, is advanced in phase by 1.6 radians compared to radiation reflected from a region 'b' in between the tracks and also in the crystalline state. Radiation reflected from a region on the tracks and in the amorphous state, 'c' in FIG. 2, is advanced in phase by 0.7 radians compared to radiation reflected from a region on the tracks and in the crystalline state, 'a' in FIG. 2.

The push-pull tracking error signal has a measured maximum value of 95% of the value obtained for a medium having a groove depth optimized for a maximum push-pull signal. The phase-detection tracking error signal has a maximum value of 0.24.

EXAMPLE III

The substrate of the recording medium is again made of polycarbonate (PC) having a refractive index of 1.58 at the design wavelength of 670 nm. The stack has the same order of layers as shown in FIG. 1. Interference layer 5 is a 70 nm thick layer of 80% ZnS and 20% $SiO_2$ having a refractive index of 2.13. Recording layer 3 is a 25 nm thick layer of a $GeSb_2Te_4$ phase-change material having a refractive index of 4.40-i 1.96 when in the amorphous state and 4.65-i 3.81 when in the crystalline state. Interference layer 6 is a 25 nm thick layer of the same material as interference layer 5. Reflective layer 7 is a 100 nm thick layer of aluminum having a refractive index of 1.98-i 7.81. The mechanical depth of grooves 9 is 51 nm, the width of the grooves is 500 nm and the pitch of the grooves is 870 nm.

The information is written in the grooves as amorphous marks in a crystalline surroundings. The intensity of reflection of stack 4 in a region of the recording layer in the amorphous state is equal to 0.043. The intensity of reflection of stack 4 in a region in the crystalline state is equal to 0.17. The ratio of the crystalline reflection over the amorphous reflection is thus 0.25. Both intensities of reflection were measured in regions that are without grooves.

Radiation reflected from a region on the tracks and in the crystalline state, 'a' in FIG. 2, is advanced in phase by 1.5 radians compared to radiation reflected from a region 'b' in between the tracks and also in the crystalline state. Radiation reflected from a region on the tracks and in the amorphous state, 'c' in FIG. 2, is advanced in phase by 0.8 radians compared to radiation reflected from a region 'a' on the tracks in the crystalline state.

The push-pull tracking error signal has a measured maximum value of 95% of the value obtained for a medium having a groove depth optimized for a maximum push-pull signal. The phase-detection tracking error signal has a maximum value of 0.3.

EXAMPLE IV

The substrate of the recording medium is made of polycarbonate (PC) having a refractive index of 1.58 at the design wavelength of 670 nm and numerical aperture of 0.60. Interference layer 5 is a 90 nm thick layer of 80% ZnS and 20% $SiO_2$ having a refractive index of 2.13. Recording layer 3 is a 30 nm thick layer of a $GeSb_2Te_4$ phase-change material having a refractive index of 4.26-i 1.69 when in the amorphous state and 4.44-i 3.08 when in the crystalline state. Interference layer 6 is a 30 nm thick layer of the same material as interference layer 5. Reflective layer 7 is a 100 nm thick layer of an aluminum alloy having a refractive index of 1.98-i 7.81. The mechanical depth d of grooves 9 is 55 nm, the width w of the grooves is 450 nm and the pitch of the grooves (which is the track pitch) is 740 nm. The dimensionless groove depth D is equal to $dn/\lambda=0.130$, the dimensionless groove width W is equal to $wNA/\lambda=0.403$.

FIG. 2 shows part of recording layer 3 having grooves 9 and lands 10. The information is written in the grooves. Recording layer 3 is initially in the crystalline state. During writing, amorphous regions 11, called marks, are made in the recording layer. The length and position of the marks represent the information recorded in the medium. The intensity of reflection of stack 4 in a region of the recording layer in the amorphous state is equal to 0.07. The intensity of reflection of stack 4 in a region in the crystalline state is equal to 0.18. The ratio of the amorphous reflection over the crystalline reflection is thus 0.39. Both intensities of reflection have been measured using a focussed radiation beam in regions without grooves.

Radiation reflected from a region on the tracks and in the crystalline state, indicated by 'a' in FIG. 2, is advanced in phase by 1.64 radians compared to radiation reflected from a region 'b' in between the tracks and also in the crystalline state. Radiation reflected from a region on the tracks and in the amorphous state, indicated by 'c' in FIG. 2, is advanced in phase by 0.6 radians compared to radiation reflected from a region on the tracks and in the crystalline state. Hence, the phase difference between the land and groove is enhanced by the phase difference between marked regions and unmarked regions in between marks. Put differently, the effective depth of the groove is enhanced at the location of the marks.

The push-pull tracking error signal has a measured maximum value of more than 95% of the value obtained for a medium having a groove depth optimized for a maximum push-pull signal. The phase-detection tracking error signal of the so-called DTD-2 type has a maximum value of 0.69 clock periods at a 0.1 μm radial tracking deviation of the focal spot, as measured by a scanning device described below. The value of the tracking error signal is a time difference normalized on the channel clock period used for writing the information on the recording medium. The tracking error signal varies less than 10% when the focal spot is defocussed by one focal depth.

EXAMPLE V

The substrate of the recording medium is again made of polycarbonate (PC) having a refractive index of 1.58 at the design wavelength of 670 nm. The stack has the same order of layers as shown in FIG. 1. Interference layer 5 is a 95 nm thick layer of 80% ZnS and 20% $SiO_2$ having a refractive index of 2.13. Recording layer 3 is a 25 nm thick layer of a $GeSb_2Te_4$ phase-change material having a refractive index of 4.26-i 1.69 when in the amorphous state and 4.44-i 3.08 when in the crystalline state. Interference layer 6 is a 35 nm thick layer of the same material as interference layer 5. Reflective layer 7 is a 100 nm thick layer of an aluminum alloy having a refractive index of 1.98-i 7.81. The mechanical depth of grooves 9 is 35 nm, the width of the grooves is 550 nm and the pitch of the grooves is 740 nm.

The information is written in the grooves as amorphous marks in a crystalline surroundings. The intensity of reflection of stack 4 in a region of the recording layer in the amorphous state is equal to 0.05. The intensity of reflection of stack 4 in a region in the crystalline state is equal to 0.16. The ratio of the amorphous reflection over the crystalline reflection is thus 0.31. Both intensities of reflection were measured in regions that are without grooves.

Radiation reflected from a region on the tracks and in the crystalline state, 'a' in FIG. 2, is advanced in phase by 1.04 radians compared to radiation reflected from a region in between tracks and also in the crystalline state. Radiation reflected from a region on the tracks and in the amorphous state, 'c' in FIG. 2, is advanced in phase by 0.7 radians compared to radiation reflected from a region on the tracks and in the crystalline state, 'a' in FIG. 2.

The push-pull tracking error signal has a measured maximum value of more than 85% of the value obtained for a medium having a groove depth optimized for a maximum push-pull signal. The phase-detection tracking error signal has a value of 0.72 clock periods at a radial tracking deviation of 0.1 μm. The tracking error signal varies less than 25% when the focal spot is defocussed by one focal depth.

Although the above examples of recording media according to the invention relate to media in which amorphous marks are written in crystalline surroundings, the invention can be applied equally well to media in which crystalline marks are written in amorphous surroundings. The invention is not limited to recording media in which the information is written in the grooves; the invention can also be applied to media in which the information is written on the lands in between the grooves. Stack 4 may have various forms. A further reflective layer may be arranged between substrate 2 and interference layer 5 of stack 4 as shown in FIG. 1. Alternatively, a further interference layer and reflection layer may be interposed between the stack and the substrate. The stack may also comprise only layers 3, 4 and 5, which stack is very suitable for write-once media. The material of the recording layer may be a phase-change material, a dye, or any other material suitable for optically writing information in.

SCANNING DEVICE

Figure 3:
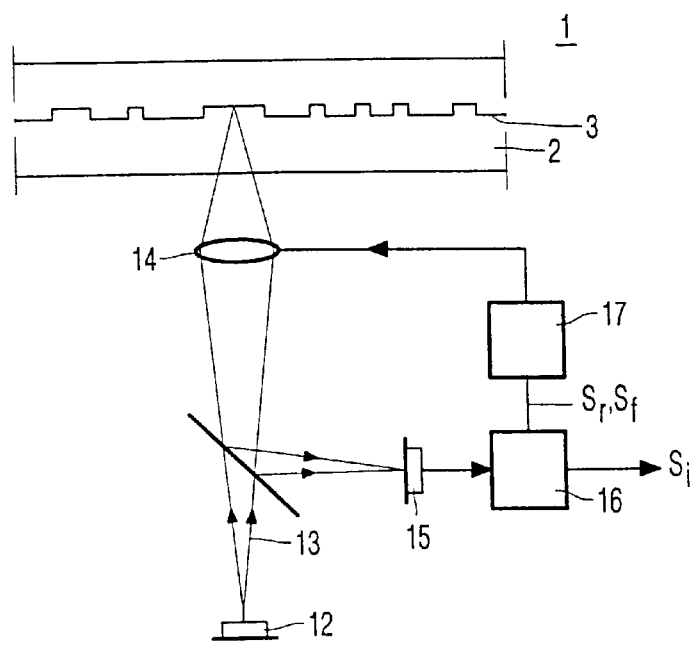
FIG. 3 shows a scanning device for scanning media according to the invention.

FIG. 3 shows an optical scanning device suitable for writing and reading information from the media according to the invention. The figure shows a part of record carrier 1 including embossed information as pits and bumps. The information layer is scanned through substrate 2. The record carrier may comprise more than one information layer, arranged one above the other.

The apparatus includes a radiation source 12, for instance a semiconductor laser, emitting a radiation beam 13. The radiation beam is focussed on information layer 3 by an objective system 14, for sake of simplicity, shown in the Figure, as a single lens. Radiation reflected by the information layer is directed towards a detection system 15 via a beam-splitter. The beam-splitter may be a semi-transparent plate or a diffraction grating, and may be polarization-dependent. The detection system converts the incident radiation into one or more electrical signals, which are fed into an electronic circuit 16 to derive an information signal $S_i$ representing information read from the record carrier, and control signals. One of the control signals is the radial tracking error signal $S_r$, representing the distance between the center of the spot formed by the radiation beam on the information plane and the center-line of the track being scanned. Another control signal is a focus error signal $S_f$, representing the distance between the focal point of the radiation beam and the information plane. The two error signals are fed into a servo circuit 17, which controls the position of the focal point of the radiation beam. In the Figure, the focus control is provided by moving objective system 14 in the direction of its optical axis in response to the focus error signal, whereas the radial tracking is provided by moving the objective system in a direction transverse to the tracks in response to the radial tracking error. During writing, the intensity of the radiation source is modulated by the information to be recorded.

Figure 4A:
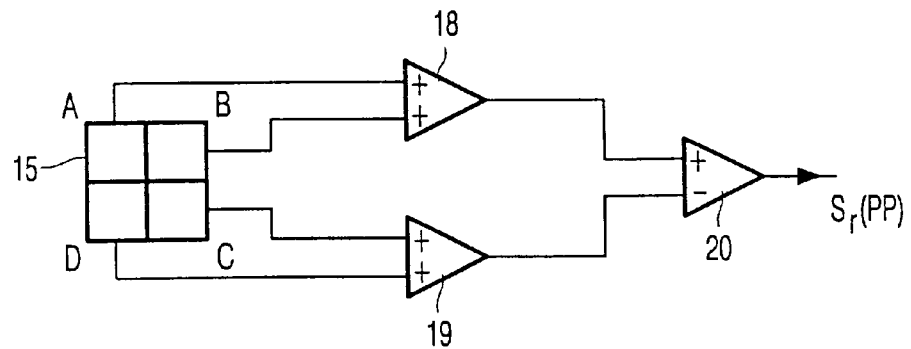
FIG. 4A shows the circuit of the device for forming a push-pull radial tracking error signal.

FIG. 4 shows the layout of the detection system 15 and part of the associated electronic circuit 16 for deriving a radial tracking error signals from the detector signals. FIG. 4A shows the circuit for deriving a radial tracking error signal according to the push-pull method. The detection system 15 includes a quadrant detector having four radiation-sensitive detection elements A, B, C and D. The detector signals from detector elements A and B are added and amplified in an amplifier 18. Likewise, the detector signals from detector elements C and D are added and amplified by an amplifier 19. The outputs of amplifiers 18 and 19 are connected to a differential amplifier 20, forming the difference of the two input signals. The output signal of differential amplifier 20 is the push-pull radial tracking error signal $S_r$ (PP). This error signal is very suitable for controlling the radial tracking servo in parts of the recording medium having tracks without written marks.

Figure 4B:
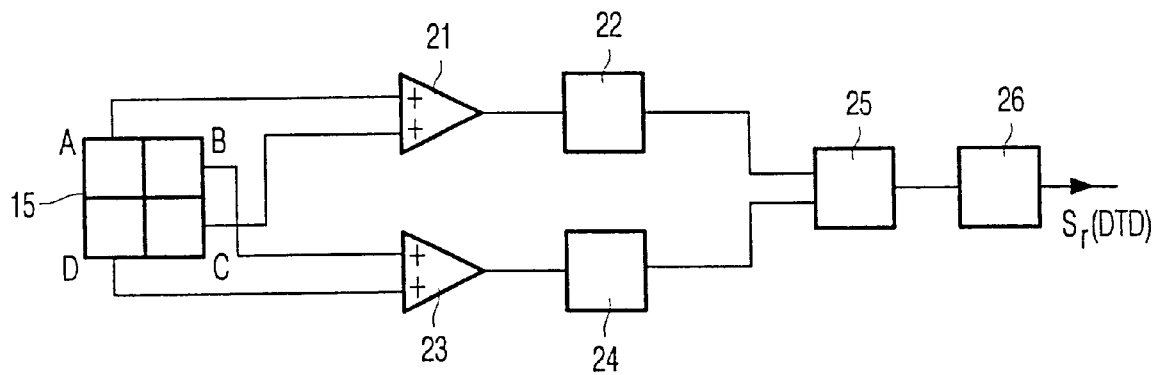
FIG. 4B shows the circuit of the device for forming a DTD radial tracking error signal.

FIG. 4B shows the circuit for deriving a radial error signal according to a high-frequency phase-detection method. The detector signals from elements A and C of detection system 15 are added and amplified in amplifier 21. The output of amplifier 20 is fed into a slicer 22. The slicer detects level-crossings of the input signal with a detection level, thereby digitizing the input signal. The detector signals of elements B and D of detection system 20 are added and amplified in an amplifier 23, the output of which is connected to an input of a slicer 24. The output signals of amplifiers 21 and 23 may be shaped by equalizers to compensate for effects of the response of the optical system of the scanning device on the detector signals, before being fed into slicers 22 and 24 respectively. The digital output signals of slicers 22 and 24 are fed into a phase comparator 25, which produces an output signal dependent on the phase between pulses in the two inputs of the comparator. The output signal of comparator 25 is low-pass filtered by filter 26. The output signal $S_r$ of filter 26 is the radial tracking error signal derived according to the diagonal time-difference (DTD) method, which is a particular embodiment of the phase-detection method. This error signal is very suitable for controlling the radial tracking servo in parts of the recording medium having written marks.

The written tracks on a recording medium according to the invention can also be followed using a radial tracking error signal derived according to other high-frequency phase-detection methods, such as the analog version of the method shown in FIG. 4B, or the analog or digital version of the phase-detection method known from inter alia U.S. Pat. No. 4,785,441.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:

1. An optical recording medium comprising:
    a substrate;
    a recording layer on the substrate, which changes from a first to a second state upon irradiation by a radiation beam, to produce written marks in the second state in a region in the first state, the marks being arranged in one or more tracks in the recording layer; and
    means in the recording layer, including a guide groove defining one or more tracks and having a width and a depth, for providing a first optical phase difference between reflection from a region on the tracks in the first state and from a region on the tracks in the second state, when irradiated by radiation beam having a predetermined wavelength and predetermined numerical aperture, the first optical phase difference enhancing a second optical phase difference between a region in between the tracks in the first state and a region on the tracks in the first state, during the irradiation, the width of the guide groove is in the range from 0.3 to 0.6 times the wavelength over the numerical aperture, the depth of the guide groove is in the range from 1/24 to 1/7 times the wavelength over a refraction index met by the radiation beam, and the first optical phase difference is in the range from 0.4 to 2.0 radians.

2. The medium of claim 1, wherein the width and depth of the guide groove comply with $$8.33\ NA\ D/n + 121\ NA/\lambda - 400\ NA\ \Phi/\lambda < W,$$

where NA is the numerical aperture, $\lambda$ the wavelength of the radiation beam in nano-meters, $\Phi$ the first optical phase difference in radians, n the refractive index, D the depth in units of $\lambda/n$, and W the width in units of $\lambda/NA$.

3. The medium of claim 1, wherein a ratio of an intensity of reflection of a region on the tracks in the second state and of a region on the tracks in the first state is larger than 0.15.

4. The medium of claim 1, wherein a ratio of an intensity of reflection of a region on the tracks in the first state and of a region on the tracks in the second state is larger than 0.15.

5. The medium of claim 4, wherein the intensity of reflection of a region on the tracks in the first state is larger than 0.15.

6. The medium of claim 5, wherein the intensity of reflection of a region on the tracks in the second state is larger than 0.15.

7. The medium of claim 1, wherein the depth of the guide groove is in the range from 1/12 to 1/7 times the wavelength over the reflective index.

8. The medium of claim 1, wherein the recording layer contains a material having an imaginary part of the refractive index in the first state larger than 3.4.

9. The medium of claim 1, wherein the recording layer contains a phase-change material.

10. The medium of claim 9, wherein the second state is amorphous.

11. An optical recording medium comprising:
    a substrate;
    a recording layer on the substrate, which changes from a first to a second state upon irradiation by a radiation beam to provide written marks in the second state in a region in the first state, the marks being arranged in one or more tracks within the recording layer; and
    means in the recording layer, including a guide groove defining one or more tracks and having a width and a depth, for providing a first optical phase difference between reflection from a region on the tracks in the first state and from a region on the tracks in the second state, when irradiated by a radiation beam having a predetermined wavelength and a predetermined numerical aperture, the first optical phase difference enhancing second optical phase difference between a region in between the tracks in the first state and a region on the tracks in the first state, during the irradiation, the width of the guide groove is in the range from 0.3 to 0.6 times the wavelength over the numerical aperture, and the width and depth of the guide groove comply with:

$$8.33\ NA\ D/n + 121\ NA/\lambda - 400\ NA\ \Phi/\lambda < W,$$

where NA is the numerical aperture, $\lambda$ the wavelength of the radiation beam in namo-meters, $\Phi$ the first optical phase difference in radians, n the refractive index, D the depth in units of $\lambda/n$ and W the width in units of $\lambda/NA$.

12. The medium of claim 11, wherein the depth of the guide groove is from 1/12 to 1/7 times the wavelength over the refractive index.

13. An optical recording medium comprising:
    a substrate;
    a recording layer on the substrate, the recording layer changing between a first and a second state upon irradiation by a radiation beam; and
    means in the recording layer, including a guide groove defining one or more tracks and having a depth for providing a first optical phase difference between reflection from a region on the tracks in the first state and from a region on the tracks in the second state, when irradiated by a radiation beam having a predetermined wavelength and a predetermined numerical aperture, the first optical phase difference enhancing a second optical phase difference between a region in between the tracks in the first state and a region on the tracks in the first state, during the irradiation, the depth of the guide groove is in the range from 1/24 to 1/7 times the wavelength, and the first optical phase difference is in the range from 0.4 to 2.0 radians.

14. The medium of claim 13, wherein a ratio of an intensity of reflection of a region on the tracks in the second state and of a region on the tracks in the first state is larger than 0.15.

15. The medium of claim 14 in which the ratio is from 0.3 to 0.5.

16. The medium of claim 14, wherein the intensity of reflection of a region on the tracks in the first state is larger than 0.15.

17. The medium of claim 13, wherein a ratio of an intensity of reflection of a region on the tracks in the first state and of a region on the tracks in the second state is larger than 0.15.

18. The medium of claim 17 in which the ratio is from 0.3 to 0.5.

19. The medium of claim 17, wherein the intensity of reflection of a region on the tracks in the second state is larger than 0.15.

20. The medium of claim 13, wherein the depth of the guide groove is in the range from $\frac{1}{12}$ to $\frac{1}{7}$ times the wavelength.

21. The medium of claim 20, wherein the second state is amorphous.

22. The medium of claim 13, wherein the recording layer includes a material having an imaginary part of the refractive index in the first state larger than 3.4.

23. The medium of claim 13, wherein the recording layer includes a phase-change material.

24. The medium of claim 13, in which the first optical phase difference is less than about 1.1 radians.

* * * * *